United States Patent
Tsunoda

[11] 3,883,232
[45] May 13, 1975

[54] RANDOM PHASE PLATE AND OPTICAL SYSTEM INCORPORATING SAID PLATE
[75] Inventor: Yoshito Tsunoda, Hachioji, Japan
[73] Assignee: Hitachi, Ltd.
[22] Filed: Dec. 3, 1973
[21] Appl. No.: 421,350

[52] U.S. Cl. ............... 350/314; 350/35; 350/162 SF
[51] Int. Cl. .......................... G02b 5/18; G02b 5/22
[58] Field of Search ......... 350/3.5, 162 SF, 162 ZP, 350/314

[56] References Cited
UNITED STATES PATENTS
3,604,778  9/1971  Burckhardt ........................ 350/3.5

OTHER PUBLICATIONS
Genovese et al. "Phase Plate Lens for a Multiple Image Lens System," IBM Tech. Discl. Bull., Vol. 8, No. 12, May 1966, pp. 1796, 1797.

Takeda et al., Random Phase Shifters for Fourier Transformed Holograms, Applied Optics Vol. 11, No. 4, April 1972, pp. 818–822.

Primary Examiner—Gerard R. Strecker
Attorney, Agent, or Firm—Craig & Antonelli

[57] ABSTRACT

A random phase plate provides multiple optical paths that can give stepwise random phase shifts varying from more than one wavelength to two, or more than two, spectral components of the transmitted beam, simultaneously.

4 Claims, 6 Drawing Figures

O → PHASE $d_1 = \frac{\lambda_1}{n_0}$ $d_2 = \frac{3\lambda_1}{n_0}$

RANDOM PHASE PLATE AND OPTICAL SYSTEM INCORPORATING SAID PLATE

BACKGROUND OF THE INVENTION

1. Field of the Invention

The present invention relates to a random phase plate to be incorporated in, for example, a color holographic memory system, a multi-colored matched filtering system and other optical systems and is capable, in particular, of simultaneously providing random phase shifts to the multiple spectral components of the incident beam.

2. Description of the Prior Art

It is well-known that a random phase plate, as shown in FIG. 1, in which unit areas, for example, squares, are provided with a plurality of fixed thicknesses, respectively are arranged to effect random phase shifts one-dimensionally or two-dimensionally to the incident beam, has been conventionally adopted, for example, in the design of a holographic memory system, a matched filtering system, and other optical systems. As a matter of course, the thickness corresponds to the optical length corresponding to the effect of the refractive index.

In the conventional design of the phase plate, respective groups of unit areas have different thicknesses, thus enabling the phase plate to provide stepwise random phase shifts to the transmitted beam. FIG. 1(a) illustrates a phase plate through which the beam is given four steps of phase shifts. FIG. 1(b) depicts a cross-sectional view of the phase plate shown in FIG. 1(a), where 1 and 2 denote the transparent base of glass or the like and the transparent dielectric layer formed on base 1 by evaporation, respectively. FIG. 1(b) depicts the case where the phase or the thickness changes in three steps with a maximum thickness $d_1$ defined by $d_1 = \lambda_1/n_0$ with $\lambda_1$ and $n_0$ representing the wavelength and refractive index, respectively.

A conventional phase plate of the above type can exert, however, a desired random phase shift effect only for an incident beam of a fixed wavelength and, if the wavelength of the incident beam changes, it cannot produce the aforementioned effect because the phase is shifted differently. Thus, for an optical system requiring a beam source having multiple wavelengths, such as a color holographic memory system and a multi-colored matched filtering system, it has always been necessary to exchange the random phase plates corresponding to a new wavelength every time the wavelength of the light source is changed and, furthermore, incidence of a multi-chromatic beam on the plate must not occur.

SUMMARY OF THE INVENTION

The present invention provides a random phase plate capable of simultaneously providing random phase shifts to the multiple spectral components of an incident beam.

The invention is also applicable to a hologram recording system capable of recording a hologram of high density and high quality in terms of a plurality of spectral wavelengths, with no need to exchange phase plates.

The invention features a phase plate design in which the maximum thickness for a plurality of unit areas is simultaneously made equal to an integral multiple of the respective wavelengths associated with the multiple spectral components of the incident beam, so as to achieve the aforementioned objectives of this invention. It also features the use of a novel phase plate in the hologram recording system for multi-chromatic recording.

DESCRIPTION OF THE PREFERRED EMBODIMENTS

Figure 1A:
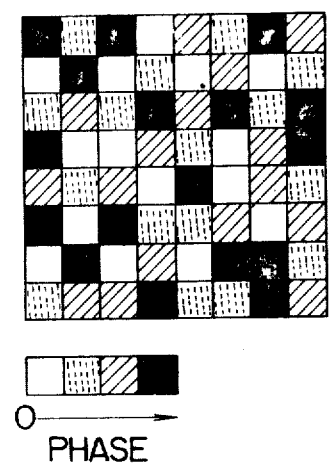
FIGS. 1(a) and 1(b) are respective top and cross-sectional views of a conventional phase plate.
Figure 1B:
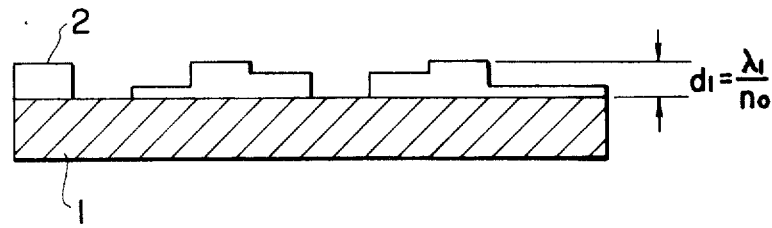

Now, consider as a phase plate, which is capable of producing random phase shifts to an incident coherent beam having a wavelength $\lambda_1$, the phase plate illustrated in FIGS. 1(a) and 1(b), comprising phase shifting square unit areas that have various membrane thicknesses, respectively, so as to provide $n$-step phase shifts to an incident monochromatic beam. Assume that, with this phase plate, the differences between two successive phase shifts applied to the beam by the passage through unit areas all equal the phase shift $\theta$. Thus, denoting respective phase shifts as $\theta_0, \theta_1, \ldots, \theta_{n-1}$, it follows that $\theta_{n-1} = n\theta_1$, where $\theta_1 = \theta$.

This phase plate can be perfected as a phase plate capable of providing a random phase shift to the beam, if the phase vectors, which represent the aforementioned phase components of the beam transmitted through the phase plate to reach the hologram recording medium, total zero.

Figure 3:
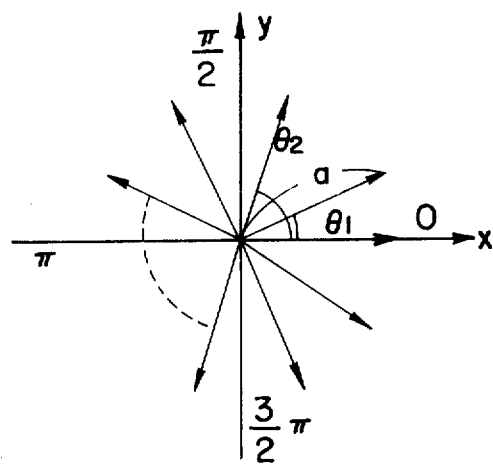
FIG. 3 is a vector diagram of the working mechanism of the phase plate of the invention.

The spatial distribution of phase vectors is shown in FIG. 3. As is clear from FIG. 3, the X and Y components of the k th phase vector $\vec{r}_k$ can be expressed as:

$(\vec{r}_k)_X = a \cos \theta_k$, and $(\vec{r}_k)_Y = a \sin \theta_k$, where $a$ represents the length of the vector. Thus, in view of the fact that the number of the vectors is always the same, the aforementioned requirement is satisfied, if a set of vectors, $\vec{r}_1, \ldots, \vec{r}_n$, totals zero.

The sum of the X components and that of the Y components are given as follows:

for X components, $$a \sum_{k=0}^{n-1} \cos k\theta = a \cos \frac{(n+1)\theta}{2} \sin \frac{n\theta}{2} / \sin \frac{\theta}{2} \quad (1)$$

and for Y components, $$a \sum_{k=0}^{n-1} \sin k\theta = a \sin \frac{(n+1)\theta}{2} \sin \frac{n\theta}{2} / \sin \frac{\theta}{2} \quad (2)$$

Both sums vanish simultaneously, if

-Continued $$\sin\frac{n\theta}{2} = 0.$$

Therefore, $$\frac{n}{2}\theta = m\pi, \text{ or}$$

$$\theta = \frac{m}{n}2\pi. \qquad (3)$$

Assume that the above expression is satisfied for an incident beam of wavelength $\lambda_1$. Equations (1) and (2) are given in terms of the wavelength $\lambda_1$. The difference between two successive phase shifts that are applied to the beam of wavelength $\lambda_2$ transmitted through such a phase plate is $$\theta' = \frac{\lambda_1\theta}{\lambda_2}$$

compared to the difference $\theta$ given to the beam of wavelength $\lambda_1$. Thus the requirement that the perfect phase plate for wavelength $\lambda_1$ is simultaneously perfect for wavelength $\lambda_2$ is expressed as:

$$\sin\frac{n}{2}\theta' = \sin\frac{n\lambda_1}{2\lambda_2}\theta = 0. \qquad (4)$$

Therefore, $$\frac{n\lambda_1}{2\lambda_2}\theta = j\pi, \qquad (5)$$

where $j$ is an integer. Substituting Equation (3) in Equation (5), $$\frac{n}{2}\frac{\lambda_1}{\lambda_2}\frac{2}{n}m\pi = j\pi,$$

$$\frac{\lambda_1}{\lambda_2}m = j. \qquad (6)$$

For example, an He-Ne laser having a wavelength $\lambda_1$ and an Ar laser having a wavelength $\lambda_2$ can be used as beam sources with $\lambda_1 = 6328$A and $\lambda_2 = 4880$A. Then $\lambda_1/\lambda_2 = 1.3$ and, therefore, the minimum integer m that approximately satisfies Equation (6) is given as $m = 3$. Substituting this in Equation (3), $$\theta = \frac{6}{n}\pi. \qquad (7)$$

Thus, it becomes only necessary to design the phase plate comprising a random arrangement of unit areas with thickness given corresponding to optical lengths, $1/n, 2/n, \ldots, n/n$ of three wavelengths for the beam of wavelength $\lambda_1 = 6328$ A. The aforementioned optical length of 3 $\lambda_1$ is approximately equivalent to the optical length of 4 $\lambda_2$ for $\lambda_2 = 4880$ A. In general, the phase plate is designed to comprise a random arrangement of unit areas with thicknesses, $1/n, 2/n, \ldots, n/n$ of the distance corresponding to the optical length simultaneously equivalent to the integral multiples of $\lambda_1$ and $\pi_2$. If $n$ is 6, the phase shifts given to the incident beam become 0, $\pi$, $2\pi$, $3\pi$, $4\pi$, and $5\pi$. In this case, unit areas with thicknesses corresponding to the above phase shifts are arranged at random in the phase plate with the numbers of unit areas with the same thickness all equal to one another. If a beam of different wavelength is further added, it is only necessary to similarly find a set of minimum integers with which the integral multiples of respective wavelengths are equal to one another. However, the only requirement is that m must satisfy Equation (6), so that many integers can be adopted in addition to the minimum one, which are integral multiples of such a minimum. In Equation (6), m is always larger than one and it follows, therefore, that the phase plate must be so designed that the maximum thickness for unit areas corresponds to the optical length larger than one wavelength with regard to each of the spectral components of the incident beam.

Figure 2:
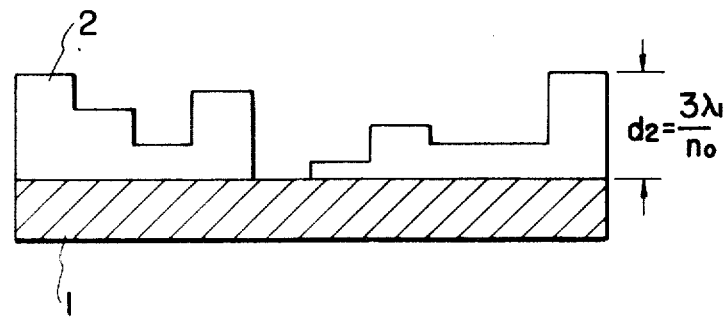
FIG. 2 illustrates a cross-sectional view of the phase plate according to the invention.

FIG. 2 depicts a cross-sectional view of a random phase plate according to the invention, where the symbols that appear in FIG. 1(b) also denote the same parts. FIG. 2 is given for $\lambda_1 = 6328$ A and $\lambda_2 = 4880$ A so that the maximum thickness and each thickness for unit areas are given as $$d_2 = \frac{3\lambda_1}{n_0} \text{ and } m \times \frac{d_2}{n}, \qquad (8)$$

respectively. FIG. 2 is given, however, for $n = 6$, i.e. six steps of thickness are given to the phase plate, which is compared to the conventional phase plate as illustrated in FIG. 1(a) where each thickness is $m \times d_1/n$ and $n$ equals 3.

It is noted that the phase plate according to the invention such as illustrated in FIG. 2 can be fabricated by depositing, for example, transparent a dielectric material 2 on a transparent base 1 made of glass or the like at six steps of membrane thickness by evaporation.

Though, in the above, description is made only of the random phase plate, this invention is also applicable to the production of a color hologram recording system incorporating the aforementioned random phase plate which requires no exchange of random phase plates for changing the recording wavelength in recording the hologram in terms of multiple wavelengths, i.e. a multi-colored hologram.

Figure 4:
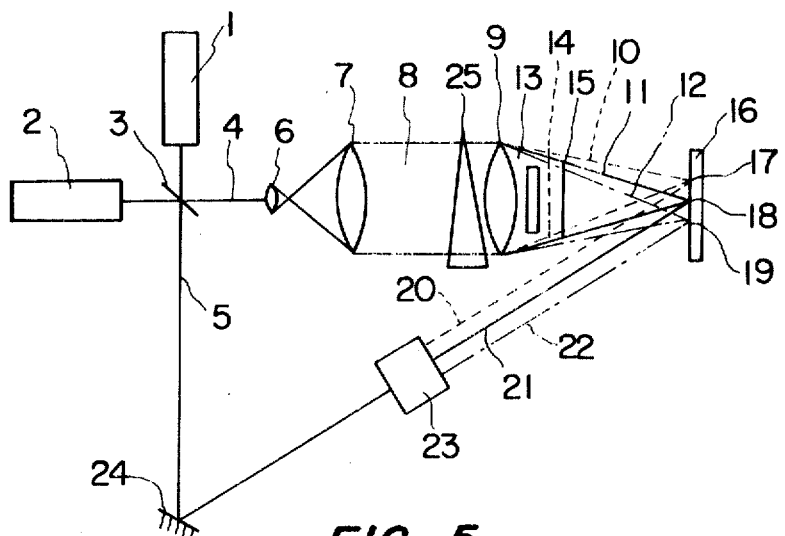
FIGS. 4 and 5 show the arrangements of the color hologram recording system and multi-colored matched filtering system embodied according to the invention, respectively.

FIG. 4 illustrates an embodiment of the aforementioned color hologram recording system. In the diagram thereof laser beams of different wavelengths originating from laser beam sources 1 and 2 are split through beam splitter 3 into an object beam 4 and a reference beam 5. Magnified beam 8, to which object beam 4 is magnified through beam magnifying lens 6 and collimator lens 7, passes through writing lens 9, a random phase plate 13 designed according to the invention, sampling mesh 14, and information storage means 15, and is focussed on photo-sensitive material 16 and mixed with reference beam 5 to form a hologram. With the insertion of beam deflecting means 25, for example a prism, in the path of magnified beam 8, the focussing beam is separated into beams of respective spectral components, as illustrated by broken lines 10, solid lines 11 and intermittent lines 12, which converge at focussing points, 17, 18 and 19, located on photo-sensitive material 16, respectively. On the other hand, the reference beam 5, reflected by reflection mirror 24, is incident on mirror deflector 23 to be separated into beams of respective spectral components, as illustrated by broken line 20, solid line 21 and intermittent line 22, which are focussed at the aforementioned focussing points, 17, 18 and 19 to form holograms. An He-Ne laser (6328 A) and an Ar laser (4880 A, 5145 A), for example, can be used as beam sources 1 and 2.

Thus, monochromatic holograms are produced at focussing points, 17, 18 and 19, respectively, in terms of red, green and blue spectra. If, simultaneously with the reproduction from such holograms, the images of respective colors overlap one another at the position where original information storage means 15 is located. It is noted that the color film can be used as such an information storage means.

Thus, the use of a random phase plate according to the invention eliminates the need for exchanging random phase plates every time the wavelength of the beam source is changed. Furthermore, the aforementioned random phase plate makes simultaneous recording of holograms in different wavelengths available by the use of the laser beam originating from a plurality of beam sources.

Next, the characteristics of the color hologram thus produced will be discussed. For simplicity begin with the recording of a monochromatic hologram. If the laser beam transmitted through lens 9 is passed only through information storage means 15, the information carrying beam is, as well-known, focussed rather locally on the photo-sensitive material. This is because the information in an image, etc. contains, in general, many low frequency components. This difficulty can be eliminated by the insertion of a mesh 14 and a random phase plate 13 in the optical path, which jointly prevent the information carrying beam from concentrating locally and cause the focussing beam to be scattered uniformly on the photo-sensitive material. That is, the information carrying beam to be recorded as a hologram is divided and sampled by mesh 14 made of, for example, circular or square holes below the resolving power of the eye to extract only the necessary information. Then, the beam is given random phase shifts with respect to multi-spectral components of the beam by passing sampled beams at respective sampling spots through phase plate 13 which is uniform for each of the sampled beams but capable of giving random phase shifts to an entire bundle of sampled beams. An autocorrelation effect between sampled beams can be prohibited by such a design, so that excellent images having high density can be reproduced without "speckle" noise. Thus, the colored image of high quality becomes obtainable by incoherently superimposing respective images that are reproduced from holograms of high quality in respective color spectra. Further, respective holograms can be recorded at high density reaching the theoretical limit and, therefore, even with a record of multiple holograms the entire recording area can be made so small that it is natural that the color hologram should be produced of incomparable high quality and density. It is noted that the mesh to sample the information carrying beam is not always necessary because the shape of the unit areas comprising the random phase plate can be so fabricated as to take the place of the mesh.

Figure 5:
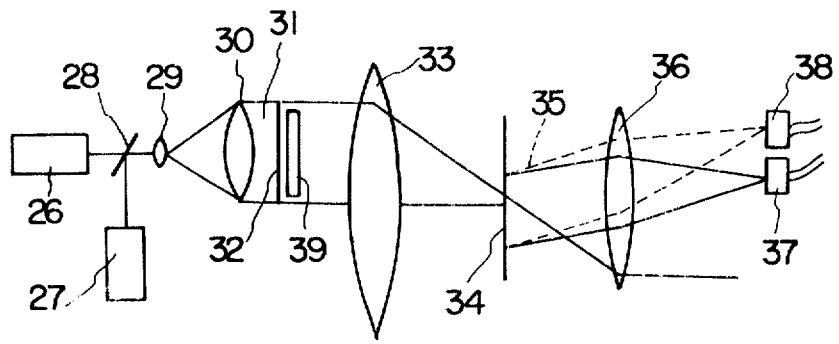

FIG. 5 illustrates another embodiment of this invention, which relates to multi-colored matched filtering system. In the diagram, the beams of different wavelengths originating from beam sources 26 and 27 are united by beam splitter 28 to form a multi-chromatic beam, which is passed through beam magnifying lens 29 and collimator lens 30 to emerge as a magnified parallel beam 31. The beam is then transmitted through unknown colored pattern 32 and random phase plate 39 embodied from this invention and after the passage through focussing lens 33 focussed on hologram 34. In the hologram patterns of various types are recorded beforehand in the Fourier transform with respect to respective color spectra.

If the unknown pattern should coincide with the pattern recorded on the hologram, diffracted beam 35 emerges from the hologram, which is focussed on detector 37 or 38 by lens 36 for detection.

Now, if patterns very similar to each other, for example, the alphabetical letters "O" and "Q", are formed on unknown pattern 32 in different colors, beams 35, different in direction from each other, are diffracted from hologram 34; for example, a beam for O and a beam for Q are focussed on detectors 38 and 37, respectively, enabling the accurate differentiation between patterns. Intensities of the diffracted beams depend on the quality of hologram 34, so that it is necessary to record the hologram of highest quality. The random phase plate for a multi-chromatic beam according to the invention can be used to record a hologram 34 of high quality.

As mentioned above, the random phase plate of this invention can give perfectly random phase shifts to the spectral components of a multichromatic beam, so that it can provide a great convenience in the design of a color holographic memory system, a multi-colored matched filtering system and other optical systems.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A random phase plate comprising:
a plurality of phase shifting elements disposed adjacent one another in a random arrangement, and having a plurality of different effective optical thicknesses, so as to provide random phase shifts to the respective spectral components of a multichromatic light beam incident thereon, and wherein the optical thickness of those elements which have the maximum optical thickness among said plurality of elements is an integral multiple of each of the spectral components of said multichromatic light beam.

2. A random phase plate according to claim 1, wherein said integral multiple is the lowest possible integral multiple of each of said spectral components, so that said maximum optical thickness is effectively minimized.

3. A random phase plate according to claim 1, wherein said plurality of elements comprises a randomly distributed two-dimensional array of said elements.

4. A random phase plate according to claim 3, wherein said array of elements is made up of a light transparent support base upon which a plurality of unit areas of material having different optical thicknesses corresponding to each of said elements are disposed.

* * * * *